(12) United States Patent
Elter et al.

(10) Patent No.: US 9,167,064 B2
(45) Date of Patent: Oct. 20, 2015

(54) UNIVERSAL DOCK AND CABLE

(75) Inventors: James Elter, Flemington, NJ (US);
Mauricio Andrada, South Plainfield, NJ (US); Yeharn Hwang, Broomall, PA (US)

(73) Assignees: VERIZON PATENT AND LICENSING INC., Basking Ridge, NJ (US); CELLCO PARTNERSHIP, Basking Ridge, NJ (US)

( * ) Notice: Subject to any disclaimer, the term of this patent is extended or adjusted under 35 U.S.C. 154(b) by 382 days.

(21) Appl. No.: 13/407,599

(22) Filed: Feb. 28, 2012

(65) Prior Publication Data

US 2013/0225096 A1   Aug. 29, 2013

(51) Int. Cl.
*H04B 1/40* (2015.01)
*H04M 1/04* (2006.01)
*H04M 1/72* (2006.01)

(52) U.S. Cl.
CPC . *H04M 1/04* (2013.01); *H04M 1/72* (2013.01)

(58) Field of Classification Search
CPC .......... H04M 1/04; H04M 1/72; H04W 88/02
USPC ......... 455/552.1, 74.1, 575.1, 557, 445, 41.2, 455/556.2, 90.3, 555, 432.1; 370/352; 369/679.55
See application file for complete search history.

(56) References Cited

U.S. PATENT DOCUMENTS

| | | | | |
|---|---|---|---|---|
| 6,011,687 | A * | 1/2000 | Gluskoter et al. | 361/679.41 |
| 6,049,454 | A * | 4/2000 | Howell et al. | 361/679.41 |
| 6,069,790 | A * | 5/2000 | Howell et al. | 361/679.43 |
| 6,266,539 | B1 * | 7/2001 | Pardo | 455/556.2 |
| 6,407,914 | B1 * | 6/2002 | Helot | 361/679.41 |
| 6,571,188 | B1 * | 5/2003 | Clarridge et al. | 702/104 |
| 6,654,826 | B1 * | 11/2003 | Cho et al. | 710/62 |
| 6,915,142 | B1 * | 7/2005 | Wietfeldt | 455/557 |
| 7,076,270 | B2 * | 7/2006 | Jaggers et al. | 455/556.1 |
| 7,110,789 | B1 * | 9/2006 | Curtiss et al. | 455/556.1 |
| 7,129,931 | B2 * | 10/2006 | Pappas | 345/168 |
| 7,146,191 | B2 * | 12/2006 | Kerner et al. | 455/558 |
| 7,286,502 | B1 * | 10/2007 | Rao et al. | 370/328 |
| 7,583,495 | B2 * | 9/2009 | Carnevali | 361/679.29 |
| 7,679,902 | B2 * | 3/2010 | Thompson | 361/679.44 |
| 7,738,247 | B2 * | 6/2010 | Choi | 361/679.43 |
| 7,885,645 | B2 * | 2/2011 | Postma et al. | 455/417 |
| 7,978,466 | B2 * | 7/2011 | Lewandowski et al. | 361/679.41 |
| 8,179,672 | B2 * | 5/2012 | Carnevali | 361/679.41 |
| 8,190,205 | B2 * | 5/2012 | Fadell et al. | 455/557 |
| 8,254,992 | B1 * | 8/2012 | Ashenbrenner et al. | 455/557 |
| 8,495,235 | B2 * | 7/2013 | Little et al. | 709/231 |
| 8,527,012 | B2 * | 9/2013 | Wright-Riley | 455/566 |
| 8,660,605 | B2 * | 2/2014 | Fleming et al. | 455/555 |
| 8,873,233 | B2 * | 10/2014 | Reber et al. | 361/679.41 |
| 8,879,430 | B2 * | 11/2014 | Goodman et al. | 370/259 |
| 2008/0278894 | A1 * | 11/2008 | Chen et al. | 361/681 |
| 2009/0215441 | A1 * | 8/2009 | Kuo et al. | 455/422.1 |
| 2011/0053643 | A1 * | 3/2011 | Shmunis | 455/556.1 |
| 2012/0046074 | A1 * | 2/2012 | Gittleman et al. | 455/557 |
| 2012/0225622 | A1 * | 9/2012 | Kudrna et al. | 455/41.2 |
| 2013/0109371 | A1 * | 5/2013 | Brogan et al. | 455/420 |

* cited by examiner

*Primary Examiner* — Marceau Milord

(57) ABSTRACT

A docking station, method, and system are disclosed including a universal dock and connection cable to establish a network connection between a mobile device and a local data network such as an enterprise Private Branch Exchange (PBX). The cable connection is reconfigurable within so that the docking station can receive a mobile communications device in different orientations. Sliding tiles within the universal dock may be repositioned for different locations of the connection cable. USB and micro-USB cable connections are described.

16 Claims, 3 Drawing Sheets

UNIVERSAL DOCK AND CABLE

BACKGROUND

In recent years, mobile communications devices or "cell phones" have become "must have" devices for most people, in many countries. The communications that such devices offer, via wireless mobile communications network, enable users to talk and exchange various types of messages for business and personal reasons and to access information, all from or while traveling through any location where a network provides service. The development of so called smart phones, which offer increased connectivity and computational functionality, has only made mobile communications devices more personal and indispensable to users, who commonly carry their smart phones where ever they go, including to work.

Often work environments utilize a private branch exchange (PBX) system to make connections among their internal telephone lines and connect the internal lines to a public switched telephone network (PSTN). A PBX system often includes extensions to other devices such as fax machines, modems, etc. Further, many PBX systems include extensions to mobile devices (e.g., cellular phones, smart phones, etc.). The PBX extension to mobile devices allows the users to use their mobile devices as virtual extensions of the PBX and benefit from the features of PBX, such as single number reachability (SNR) and simultaneous ringing. Existing connection devices for such systems are limited to certain mobile devices and particular orientations of use.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF PREFERRED EMBODIMENTS

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

The various preferred embodiments disclosed herein relate to telephony systems, apparatus, and methods useful to facilitate connecting a mobile communications device (also referenced as a "mobile station" or "smart phone") to a local network by use of a docking station having a universal dock. The docking station and universal dock establish a physical connection to the mobile communications device, and the physical connection is suitable for a network connection such as an Ethernet for an enterprise Private Branch Exchange (PBX).

Reference now is made in detail to the examples illustrated in the accompanying drawings and discussed below.

Figure 1:
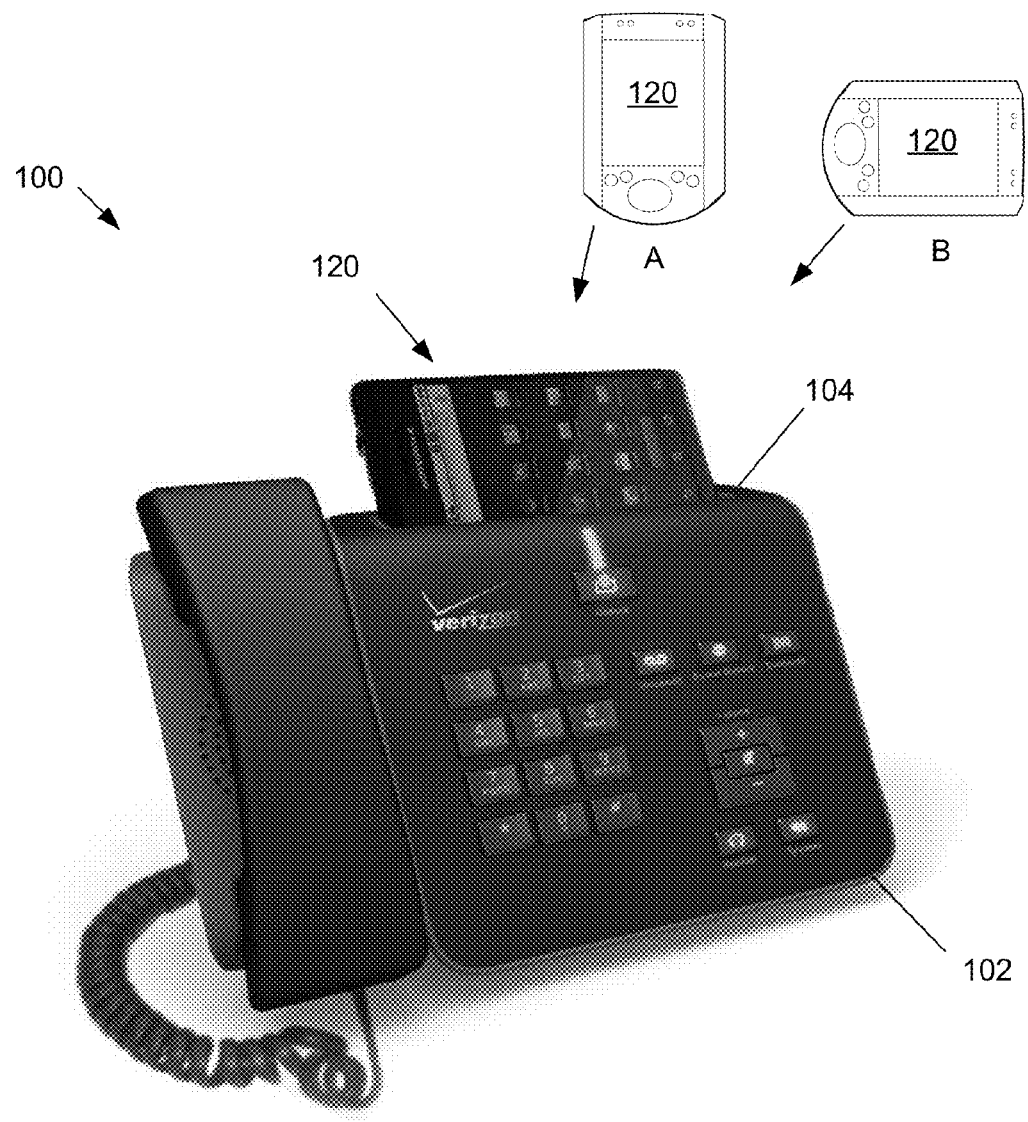
FIG. 1 depicts an example of a docking station including a universal dock for a mobile communications device.

FIG. 1 depicts an example of a docking station 100 including a universal dock for a mobile communications device. As illustrated, the docking station 100 includes a housing 102 of suitable material, which includes an aperture or port, referred to as a universal dock 104, for receiving a mobile communications device 120. The port 104 can receive the mobile communications device 120 in different orientations, e.g., vertical (portrait) and horizontal (landscape) indicated by orientations A and B. As described in further detail below, docking station 100 also includes a connection apparatus or physical interface (e.g., a universal serial bus (USB) connector) for connection to the mobile communications device 120.

In exemplary applications, the docking station 100 can be used to establish a network connection between the mobile communications device 120 and a local network (not shown) such an enterprise private branch exchange (PBX) or other network. To facilitate use of telephony and/or enterprise network features (e.g., voice calls, voicemail access, etc.), as shown the docking station 100 can include a handset and speaker as well as a keypad and other user interface components.

Figure 2:
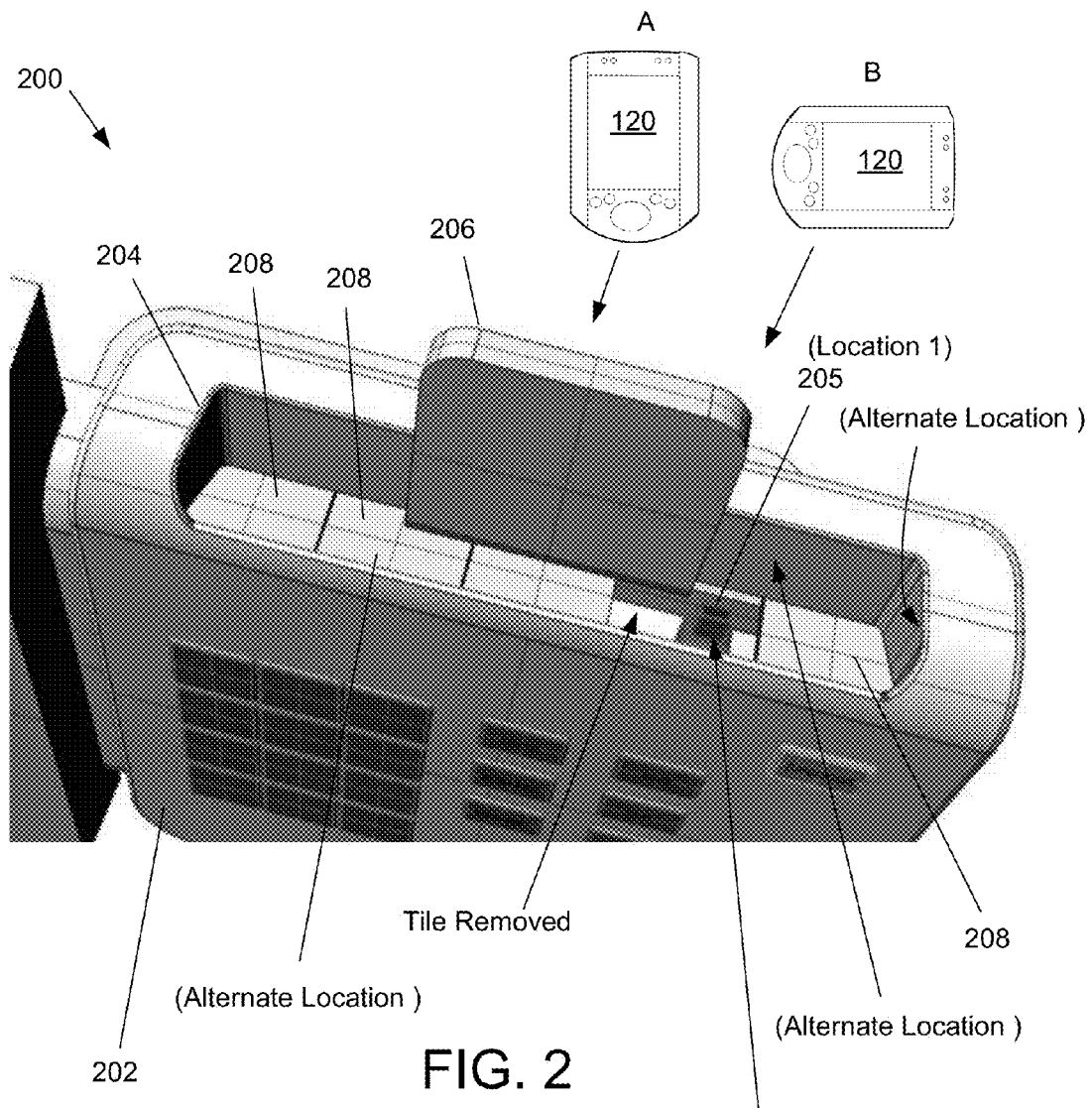
FIG. 2 depicts a perspective view of an example of a docking station illustrating the interior of a universal dock including a cable connection for connection to a mobile communications device.

FIG. 2 depicts a perspective view of an example 200 of a docking station illustrating the interior of a universal dock or port 204 including a cable connection 205 for connection to a mobile communications device 120. A support surface or cradle 206 may be present for additional support for the mobile communications device 120 when placed in the docking stations (e.g., in a "docked" state). The cradle 206 may be extendable and/or removable for some embodiments. The port 204 is thus sized to fit the largest mobile communications device 120 that is to be received. Smaller mobile communications devices are able to be securely and stably accommodated by, for example, adjusting the size of the support surface or cradle 206 without the addition of a separate adapter (which may easily be misplaced).

The universal dock 204 can receive a mobile communications device 120 in different orientations, such as indicated by orientations A and B (though other orientations are possible), again without the use of a separate adapter. To facilitate this capability, the universal dock 204 has a number of movable pieces (e.g., tiles) 208 at the base/bottom of the port 204. These pieces or tiles 208 can be moved within or added/removed from the universal dock 204 in any desired way so that the cable connection 205 can be positioned at a desired location within the aperture of the universal dock 204. In some embodiments, the tiles 208 can be moved by sliding only within a limited range to provide the cable connection 205 access to the port 204. In this case, for example, the tiles 208 most proximate to the opposing ends/sidewalls of the port 204 (one of which as shown in FIG. 2 is labeled "alternate location") may be integral with or otherwise permanently fixed within the port 204 and thus unable to be moved or removed.

By removing a tile 208 at a particular position within the universal dock 204 and positioning the cable connection 205 at that location, the docking station 200 can be configured (e.g., by a user or vender) to receive a given mobile communications device 120 in a desired orientation, while still establishing a desired network connection through the physical interface afforded by the cable connection 205. The tiles 208 may of course be any suitable size and shape, not just those indicated. For example, the tiles 208 may be uniform in size or may vary with position, e.g., the tiles 208 proximate to the center of the port 204 being larger or smaller than the tiles 208 proximate to the ends of the port 204. In either case, the opening formed by a missing tile 208 may be large enough to admit the cable connection 205 to allow the cable connection 205 to extend from the internal portion of the docking station 200 through the opening to within the port 204.

In some embodiments, the tiles 208 may slide within the aperture of the universal dock 204 for ease in configuration of the dock for a particular orientation of a particular mobile communications device 120. For example, the tiles 208 may be at slightly different levels within the port 204 and either slid along different tracks or grooves in the side of the port 204 or moved slightly up or down and slid along a single track/groove that is wide enough to contain multiple tiles 208. Representative alternative locations are shown for the cable connection 205, including on the side walls of the universal dock; other locations may be used. In some embodiments, tiles may be present in the side walls (and thus be able to be moved/removed in a manner similar to those in the base of the port 204), while in other embodiments the sidewalls may be formed from a molded material integral with the dock 204 and have a permanent opening for the cable connection 205. Of course, while one cable connection 205 is shown for docking station 200, others may be present, and these may support additional orientations or makes of mobile communications devices.

Figure 3:
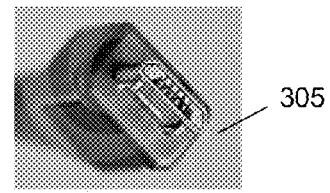
FIG. 3 is view of an example of a cable connection suitable for use with a universal dock and mobile communications device.

FIG. 3 is view of an example of a cable connection 305 suitable for use with a universal dock and mobile communications device. Such a cable connection 305 is used to connect to a corresponding connection (e.g., receiving port) on a mobile communications device. In some embodiments, the cable connection 305 includes a USB cable connection. In some further embodiments, the cable connection 305 includes a micro-USB connection. Other suitable cable connections may further be used. In some embodiments, multiple different types of cable connections (e.g., both a USB and micro-USB) may be available. Although in some embodiments the different cable connections may be available throughout the port, in other embodiments (e.g., in which the tiles are of different sizes in different locations or the openings in the sidewalls are smaller than the tiles), access to the larger of the connections may be more limited.

Figure 4A:
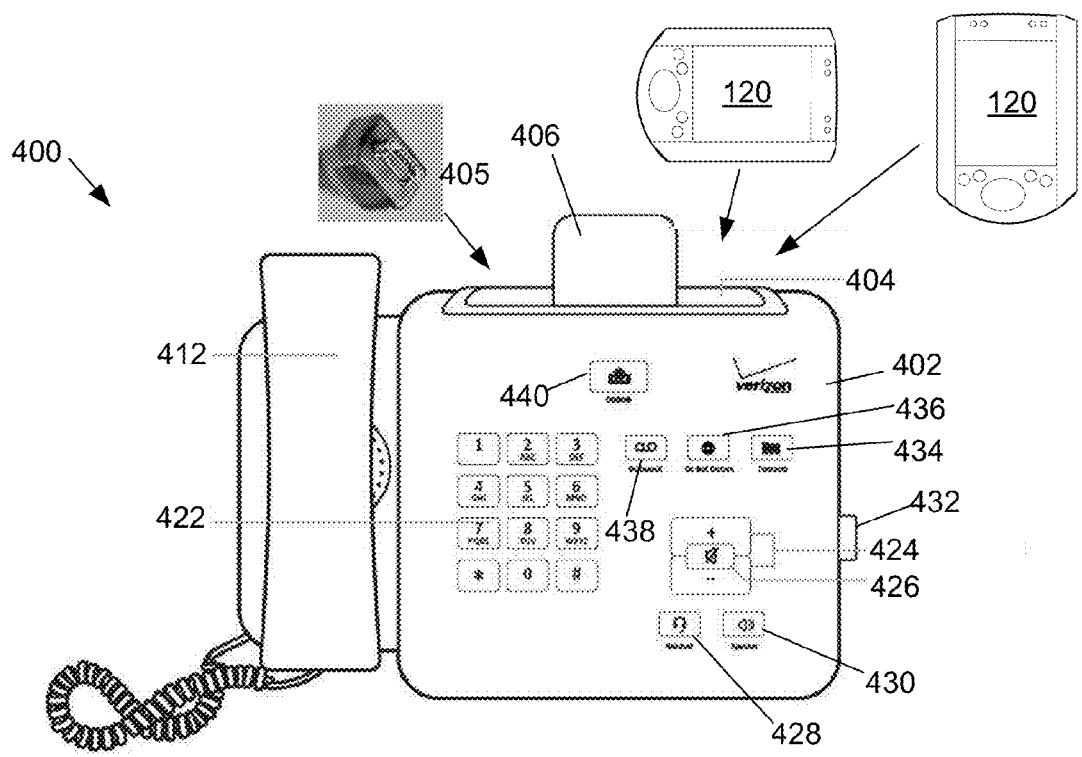
FIG. 4A depicts a front view of an example of a docking station with universal dock.
Figure 4B:
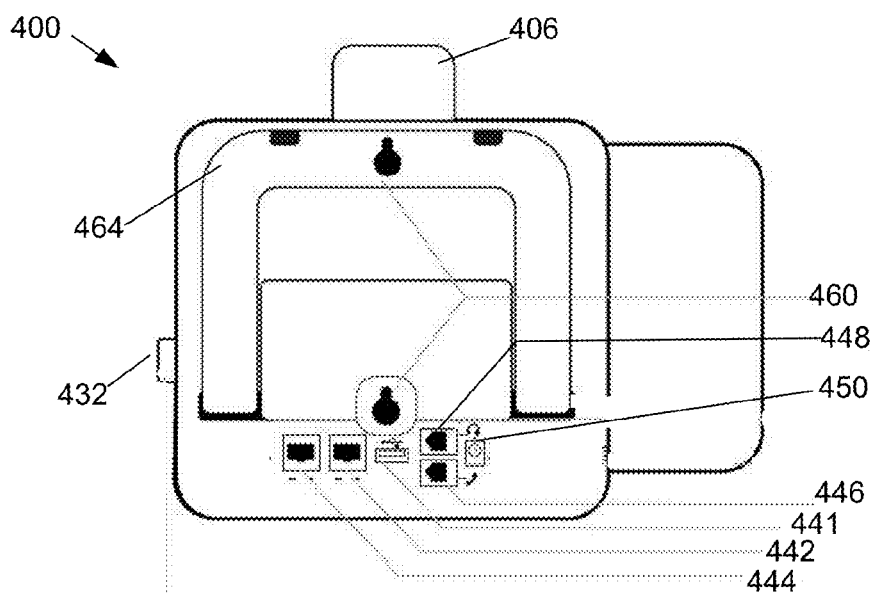
FIG. 4B depicts a rear view of the docking station of FIG. 7A.

FIGS. 4A-4B depict front and rear views of an exemplary embodiment of a docking station 400 that can be used to connect a mobile communications device (e.g., 120 of FIGS. 1-2) to a local network (e.g., SIP IP PBX). Docking station 400 includes an aperture or universal dock 404 and at least one connection cable 405 (e.g., micro-USB cable connection).

Docking station 400 is shown including a housing 402 (e.g., made of a suitable material such as plastic). A raised surface or cradle 406 may also be present to facilitate secure holding of the mobile communications device. Docking station 400 can include a handset hand set 412, a touch screen or keypad 422, which includes a number of pads of keys for user input. Examples include number keys 422, volume buttons 424, a mute button 426, an adjustment knob/button 432 (for reclining support stand 464), a "contacts" 434, a "do not disturb" button 436, and a voicemail button 438. In exemplary embodiments, a button/indicator 440 may present to indicate docking status and to initiate undocking of a mobile communications device from the docking station. The button/indicator 440 may include a lighting feature, e.g., a LED, providing a visual indication of docking status of the mobile communication device 120 with the docking station 400 (e.g., on/off or different colors depending on the status).

FIG. 4B shows the rear of docking station 400, including a USB jack (or port) 441 such as one suitable to receive one end of a USB or micro-USB smartphone cable; the other end is for the mobile communications device (e.g., Android smart phone) used with the docking station 400. Shown are Ethernet In and Out ports 442 and 444. Two handset jacks (ports) 446-448 are present, as is a DC power jack (connection) 450. To facilitate mounting on a surface, mounting hooks/apertures 460 may also be provided. As previously noted, adjustable reclining support stand 464 may also be provided.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A docking station configured to establish a physical connection interface between a mobile communications device and a network, the docking station comprising: a housing with a universal dock formed as a recess in the surface of the housing, the recess having side walls and a support surface, wherein the recess includes a plurality of movable tiles on a track on the support surface and on at least one of the side walls, each movable tile defining a respectively different location within the recess for a cable connection to be positioned to connect to a receiving port of the mobile communications device to form a network connection for the mobile communication device; wherein at least one tile of the movable tiles is configured to move within the track to form an opening in the recess at which the cable connection is configured to connect to the receiving port of the mobile communications device, the at least one tile moving in a direction parallel to the at least one side wall and then in a direction parallel to the support surface to a position in the track where the one tile is aligned with another tile within the track.

2. The docking station of claim 1, wherein the cable connection comprises a USB connection.

3. The docking station of claim 1, wherein the plurality of tiles are slideably disposed in the track within the recess of the universal dock.

4. The docking station of claim 1, further comprising a cradle disposed adjacent the universal dock and configured to support a mobile communications device positioned within the recess of the universal dock.

5. The docking station of claim 1, further comprising a second cable connection moveably disposed within the recess of the universal dock.

6. The docking station of claim 1, wherein the plurality of tiles are removably disposed within the universal dock.

7. The docking station of claim 1, wherein:
at least one of the side walls includes a plurality of tracks at different levels and ones of the tiles being disposed in respective ones of the plurality of tracks and being configured to slide within the respective tracks.

8. A method comprising:
selecting a location for a cable connection within a docking station, the selected location corresponding to one of a plurality of movable tiles within the docking station, each movable tile defining a respectively different location in the docking station for the cable connection to connect to a receiving port of the mobile communication device;
positioning the cable connection at the selected location defined by one of the plurality of movable tiles within the docking station;
configuring the receiving port of the mobile communications device at the selected location defined by the one of the plurality of movable tiles, at a desired orientation; and
physically connecting the receiving port of the mobile communications device to the cable connection of the docking station;
disconnecting the receiving port of mobile communications device from the cable connection of docking station;
selecting a different location for the cable connection within the docking station, the selected different location corresponding to a different one of the plurality of movable tiles within the docking station;
repositioning the cable connection at the selected different location within the docking station;
reconfiguring the mobile communications device in a different orientation, corresponding to the selected different location in the docking station; and
reconnecting the receiving port of the mobile communications device in the different orientation to the cable connection at the selected different location in the docking station.

9. The method of claim 8, further comprising establishing a network connection between the mobile communications device and a local network via the cable connection and the receiving port.

10. The method of claim 8, wherein the cable connection comprises a USB connection.

11. The method of claim 8, further comprising establishing a network connection between the mobile communications device and a local network via the cable connection and the receiving port.

12. A system comprising: a docking station housing with a universal dock formed as a recess in a surface of the docking station, the universal dock having side walls and a support surface, the sidewalls extending into the housing between the surface of the docking station and the support surface, the recess of the universal dock being configured to receive a mobile communications device in a plurality of orientations, wherein the universal dock includes a plurality of movable tiles configured in the recess parallel to the support surface and a plurality of tiles configured in a track on the support surface and on at least one of the sidewalls, each movable tile defining a respectively different location within the dock for a cable connection to connect to a receiving port of the mobile communications device; a cable connection movably disposed within the universal dock and configured to provide a physical cable connection interface with the receiving port of the mobile communications device, wherein the physical cable connection interface is configured to form a network connection for the mobile communication device and wherein the physical cable connection is configured to be moved among the locations in the dock corresponding to the movable tiles to a selected location corresponding to one of the movable tiles; and a mobile communications device having the receiving port configured to establish the network connection through the cable connection in the docking station when the mobile communications device is docked to the docking station at the selected location, wherein at least one tile of the movable tiles is configured to move within the track to form an opening in the recess at which the cable connection is configured to connect to the receiving port of the mobile communications device, the at least one tile moving in the track in a direction parallel to the at least one side wall and then in a direction parallel to the port surface to a position in the track where the one tile is aligned with another tile within the track.

13. The system of claim 12, wherein the cable connection comprises a USB connection.

14. The system of claim 12, wherein the plurality of tiles are removably disposed in the universal dock.

15. The system of claim 12, wherein the plurality of tiles are slideably disposed in the universal dock.

16. The system station of claim 12, wherein:
   at least one of the side walls includes a plurality of tracks at different levels and ones of the tiles being disposed in respective ones of the plurality of tracks and being configured to slide within the respective tracks.

\* \* \* \* \*